United States Patent
Isurin et al.

(10) Patent No.: US 7,123,123 B2
(45) Date of Patent: Oct. 17, 2006

(54) HIGH-FREQUENCY POWER TRANSFORMER

(75) Inventors: Alexander Isurin, Dublin, OH (US); Scott Douglas Howard, Hilliard, OH (US); Alexander Cook, Dublin, OH (US)

(73) Assignee: Vanner, Inc., Hillard, OH (US)

( * ) Notice: Subject to any disclaimer, the term of this patent is extended or adjusted under 35 U.S.C. 154(b) by 0 days.

(21) Appl. No.: 11/330,296

(22) Filed: Jan. 11, 2006

(65) Prior Publication Data

US 2006/0152318 A1 Jul. 13, 2006

Related U.S. Application Data

(60) Provisional application No. 60/643,204, filed on Jan. 12, 2005.

(51) Int. Cl.
*H01F 5/00* (2006.01)
(52) U.S. Cl. ..................................... 336/200
(58) Field of Classification Search .................. 336/65, 336/83, 200, 232; 361/760–766
See application file for complete search history.

(56) References Cited

U.S. PATENT DOCUMENTS

| | | | |
|---|---|---|---|
| 4,803,609 A * | 2/1989 | Gillett et al. .................. 363/17 |
| 4,864,486 A * | 9/1989 | Spreen ........................ 363/126 |
| 4,965,712 A * | 10/1990 | Duspiva et al. ............. 363/126 |
| 5,225,971 A * | 7/1993 | Spreen ........................ 363/17 |
| 5,990,776 A | 11/1999 | Jitaru .......................... 336/200 |
| 6,128,817 A * | 10/2000 | Roessler et al. .............. 29/606 |
| 6,927,661 B1 | 8/2005 | He et al. ..................... 336/200 |

* cited by examiner

*Primary Examiner*—Tuyen T Nguyen
(74) *Attorney, Agent, or Firm*—James R. Eley; Michael A. Forhan; Eley Law Firm Co.

(57) ABSTRACT

A high-frequency transformer. The transformer comprises a high-voltage winding. A first bus bar is positioned proximate the high voltage winding and extends to a first portion of a plurality of power switching devices. The first bus bar is electrically coupled to the first portion of the power switching devices. A second bus bar is positioned proximate the high voltage winding and extends to a second portion of the power switching devices. The second bus bar is electrically coupled to both the high voltage winding and the second portion of the power switching devices. A third bus bar extends between the first and second bus bars and is electrically coupled to the first bus bar, second bus bar, and the high voltage winding. The second and third bus bars form a low voltage winding that electrically cooperates with the high voltage winding to form the high-frequency transformer.

23 Claims, 8 Drawing Sheets

HIGH-FREQUENCY POWER TRANSFORMER

This application claims priority to U.S. provisional application 60/643,204, filed Jan. 12, 2005, the contents of which are hereby incorporated by reference.

FIELD

This invention relates to power transformers. In particular, this invention relates to the integration and connection of a power stage to a high-frequency, high-current power transformer in a switch mode power supply.

BACKGROUND

A power stage of a voltage step-up switch mode power supply ("SMPS") drives the primary (low voltage) winding of a transformer with a high frequency alternating voltage, creating an alternating magnetic field around the primary winding and through a core of the transformer. One or more secondary (high voltage) windings are also wrapped around the core and are located in close proximity to the primary winding. The alternating magnetic field around the primary winding induces an AC voltage in the secondary winding. In most SMPS, the AC output of the transformer's secondary winding is rectified to provide a DC voltage at the output of the power supply. Compared with a low-frequency power supply, a high-frequency SMPS has a number of advantages, the most significant of which are suitability for low-cost manufacturing, and reduced size and weight. Consequently, SMPSs are considered to be more economical than low-frequency power supplies. With a voltage step-down SMPS the process occurs in reverse, with the primary winding being the high voltage winding and the secondary winding being the low voltage winding.

Surface mounted active and passive electronic components, commonly called surface mounted devices ("SMDs"), are typically employed in SMPS applications to further reduce the size and weight of the power supply. SMDs are also well-suited for automated and high-volume production, making them more cost-effective than non-surface mounted designs. In order to reduce the size of SMDs and thus further reduce the size and weight of the SMPS, it is necessary to increase the commutation frequency of the power devices in the power stage of the SMPS. When the commutation frequency is increased, the length of connecting wires conducting high frequency current between the power stage and the transformer are preferably minimized in order to eliminate parasitic impedances, which can reduce the efficiency of SMPS and generate electromagnetic interference ("EMI"). Parasitic impedances can be a significant issue with high-frequency SMPS where the high-frequency currents, e.g., typically in the range of about 100–200 kHz, often reach around 300 to 400 amperes in low-voltage circuits, e.g., in the range of about 10–60 volts RMS, of the SMPS. Losses and impedances in the connecting wires can be significant enough that it becomes unacceptably inefficient or impractical to use a high commutation frequency, thereby forcing SMPS designers to resort to lower frequencies, e.g., around 50 kHz, with the corresponding size and weight disadvantages.

There is a need for a cost-effective way to reduce parasitic impedances associated with connecting wires in high-frequency, high-current switch mode power supplies, this parameter being critical to good performance.

SUMMARY

According to the present invention, the usual connecting wires between a low voltage power stage and a transformer of a SMPS are replaced with bus bars that are incorporated into and made part of a power transformer magnetic system. The low voltage, high-current windings of the power transformer also serve as an integral bus bar, connecting the power transformer with a power stage comprised of power switching devices such as metal oxide semiconductor field effect transistors ("MOSFETs"). The low voltage power stage can be configured as either an H-bridge or a half bridge.

An aspect of the present invention is a high-frequency transformer. The transformer comprises a high-voltage winding. A first bus bar is positioned proximate the high voltage winding and extends to a first portion of a plurality of power switching devices. The first bus bar is electrically coupled to the first portion of the power switching devices. A second bus bar is positioned proximate the high voltage winding and extends to a second portion of the power switching devices. The second bus bar is electrically coupled to both the high voltage winding and the second portion of the power switching devices. A third bus bar extends between the first and second bus bars and is electrically coupled to the first bus bar, second bus bar, and the high voltage winding. The second and third bus bars form a low voltage winding that electrically cooperates with the high voltage winding to form the high-frequency transformer.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

In the discussion that follows, like reference numerals will be used to represent like structures in the various embodiments. A low voltage printed circuit board assembly ("PSA") 10, shown in FIGS. 1–4, includes an assembled power transformer 12. PSA 10 further includes a power stage arranged as an H-bridge power switch 14 with commutation frequency of about 200 kHz. In other embodiments, other frequencies and power switch arrangements may be used, such as a half-bridge configuration. Current flowing through a low voltage winding of the power transformer of the embodiment shown may be in the range of up to about 350 amperes RMS continuously. PSA 10 is assembled upon a printed circuit board 18 using a plurality of SMD components 20, as discussed in more detail below, to make up power switch 14. In the embodiment shown, PSA 10 is a subassembly of a bi-directional DC-DC converter and may be configured with a voltage ratio of about 40 to 1.

Figure 1:
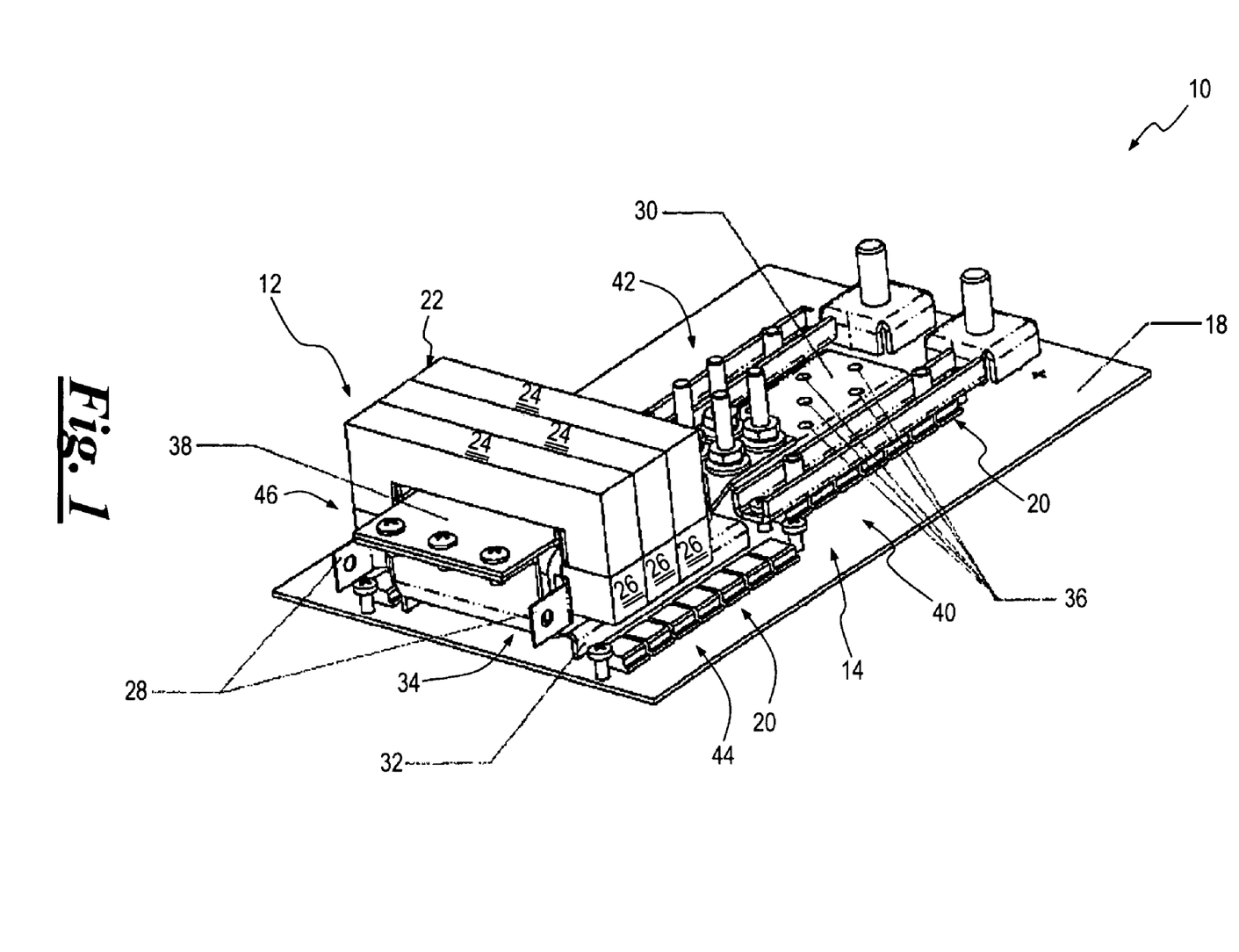
FIG. 1 depicts a perspective view of a power supply board for a switch mode power supply, comprising a low-voltage power stage and a transformer according to an embodiment of the present invention.
Figure 2:
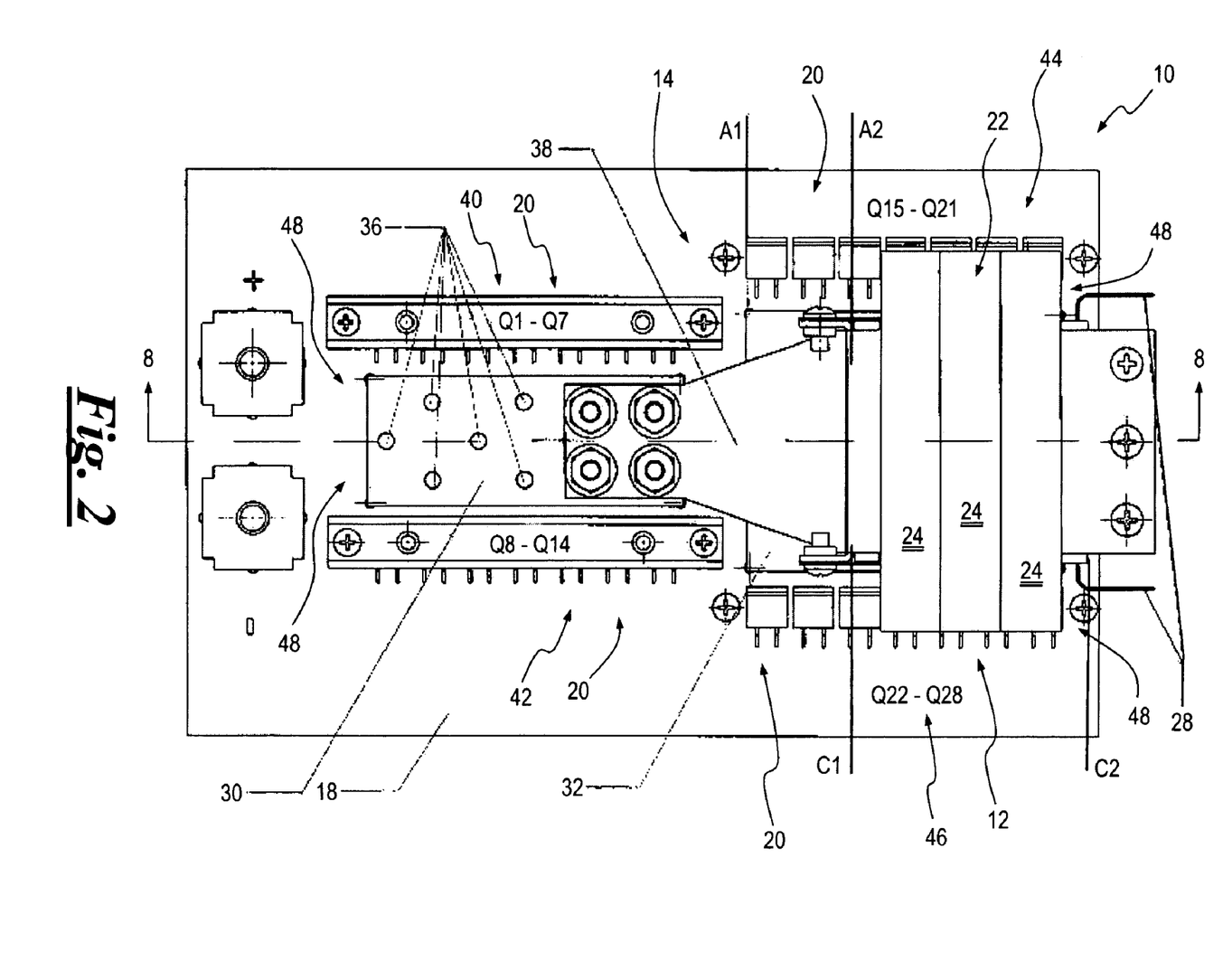
FIG. 2 is a top plan view of the power supply board of FIG. 1.
Figure 3:
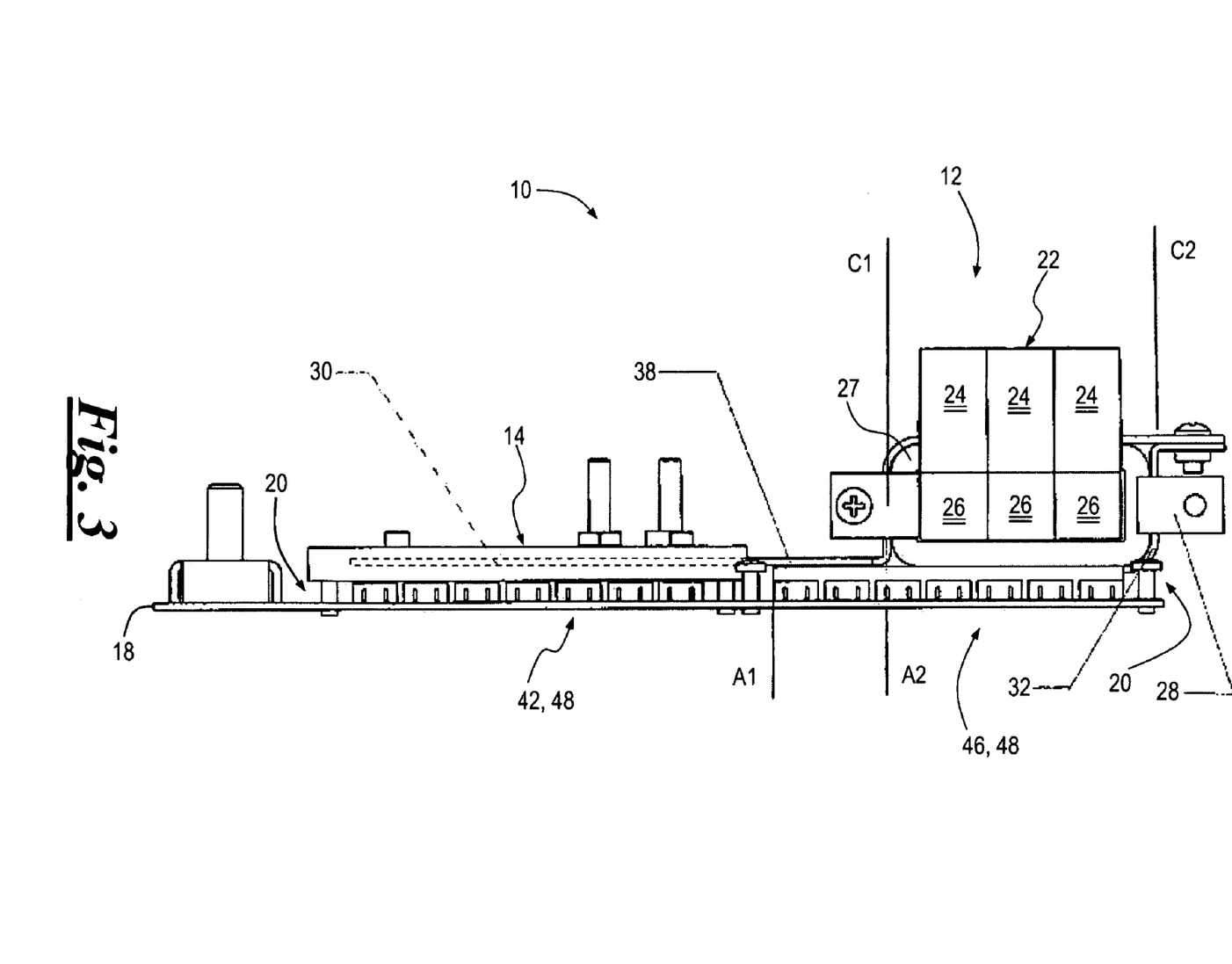
FIG. 3 is a side elevational view of the power supply board of FIG. 1.
Figure 4:
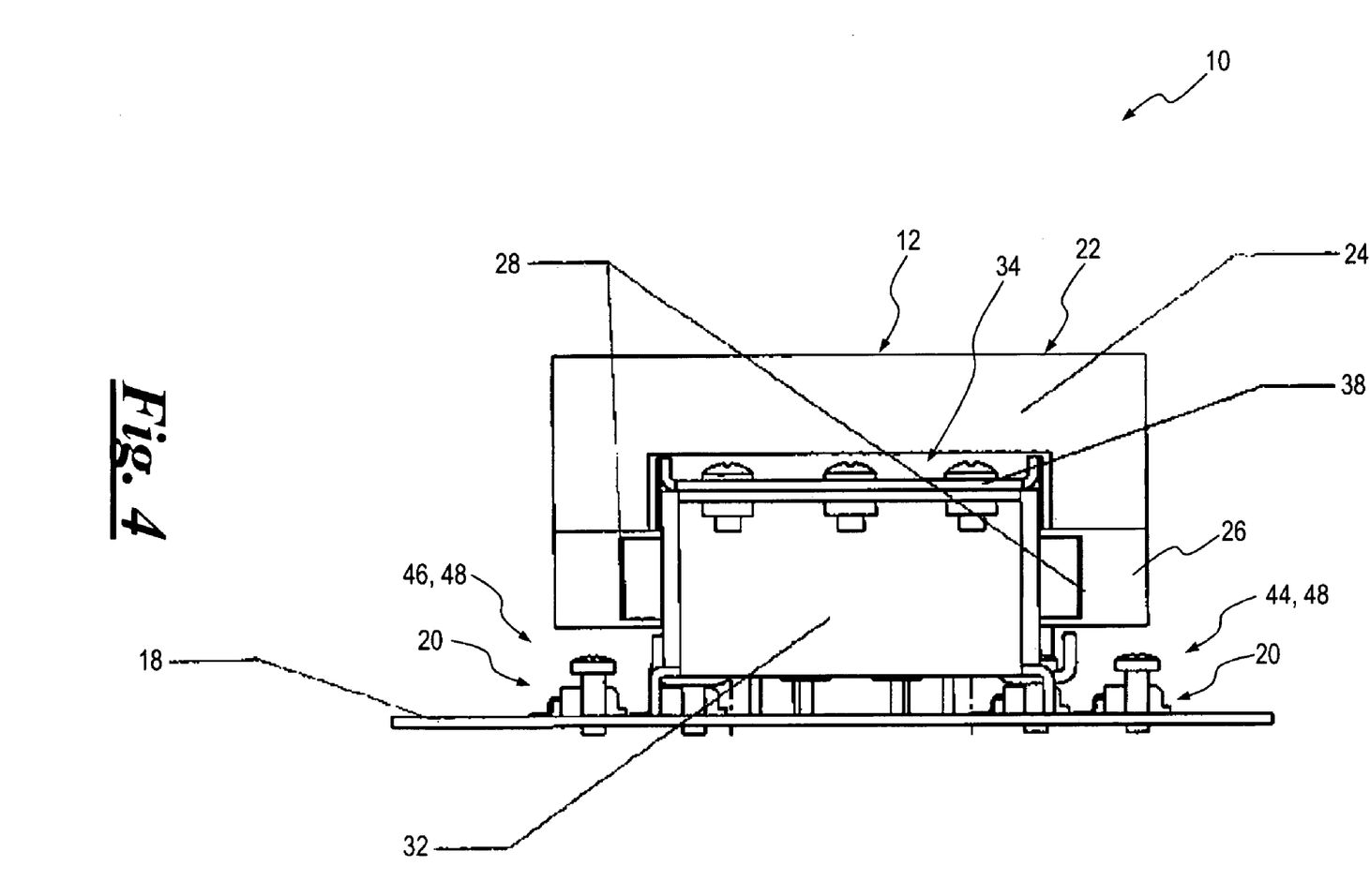
FIG. 4 is an end elevational view of the power supply board of FIG. 1.

Power transformer 12 may include a ferrite core assembly 22 comprising three U-shaped cores 24 and three I-shaped cores 26. The number of cores 24, 26 may vary, depending upon the operating voltage for a particular power transformer 12 and the selected commutation frequency. The low voltage winding of transformer 12 may be one turn located proximate a high voltage winding 27 of the power transformer and inductively electrically coupled thereto. One example embodiment of the present invention utilizes a first bus bar 30, a second bus bar 32 and a third bus bar 38. In the example embodiment, as shown in FIG. 2, a single-turn low-voltage winding is comprised of second bus bar 32 and third bus bar 38. Transformer 12 also includes a pair of electrical connection terminals 28, coupled to the high voltage winding 27.

Figure 5:
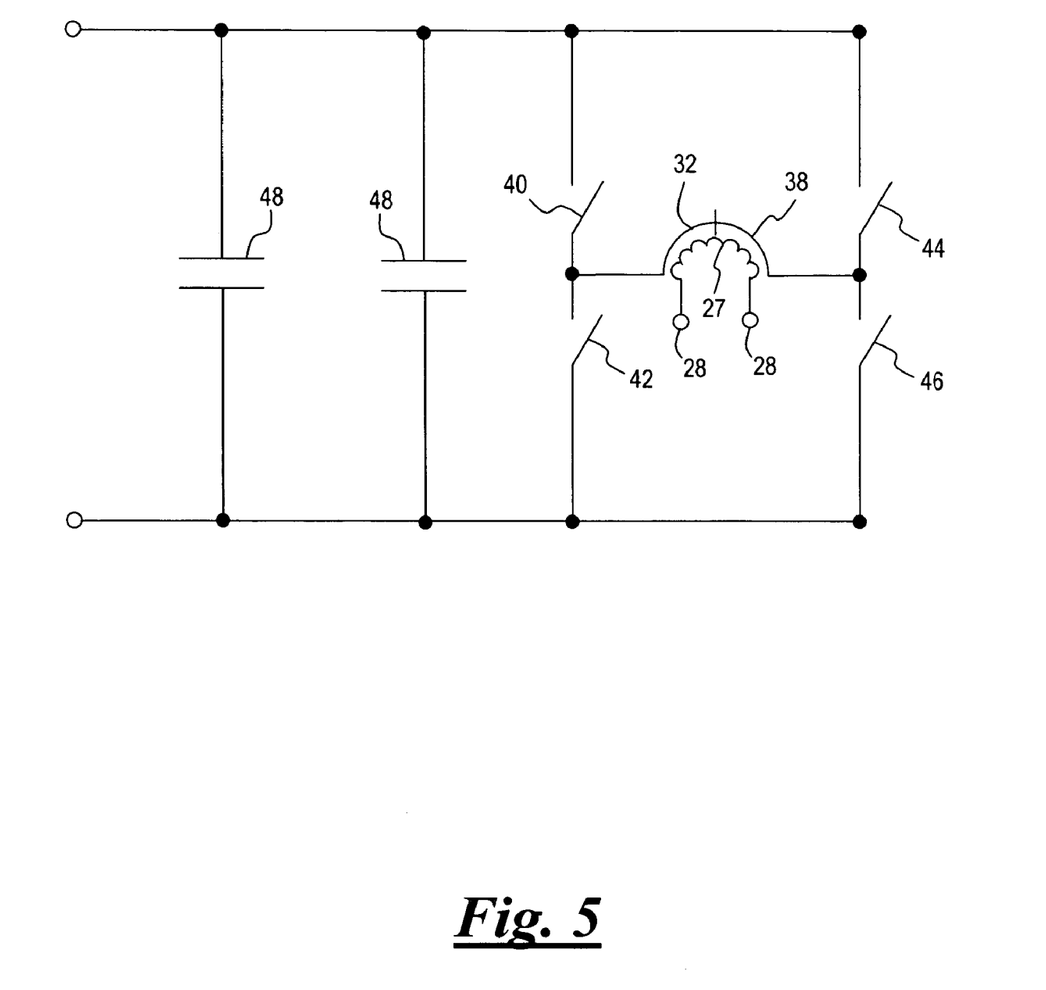
FIG. 5 is a schematic diagram of a portion of a power supply according to an embodiment of the present invention.

First bus bar 30 connects a source terminal of each of a first group 40 of power devices such as MOSFETs, identified as Q1–Q7 in FIG. 2, with a drain terminal of a second group 42 of MOSFETs, identified as Q8–Q14 in FIG. 2, to form a first leg of power stage 14. Likewise, second bus bar 32 connects the source terminals of a third group 44 of MOSFETs, identified as Q15–Q21 in FIG. 2, with the drain terminals of a fourth group 46 of MOSFETs, identified as Q22–Q28 in FIG. 2, to form a second leg of power stage 14. The width of bus bar 32 is generally equal to the width of a core window 34 of power transformer 12, shown best in FIG. 4, to minimize losses and maximize performance. Bus bar 32 also provides a first portion of the low voltage turn of transformer 12, extending generally from "C1" to "C2." A plurality of decoupling capacitors 48 may be located underneath the bus bars 30, 32. The capacitors serve to provide a low impedance supply to an H-bridge formed in a conventional manner by MOSFET groups 40, 42, 44, 46 (Q1–Q28). The width of bus bar 30 is determined by the space needed by capacitors 48, located under the bus bar, by the requirement to handle the full transformer low voltage winding current, and the need to minimize parasitic inductance. Similarly, the length and shape of bus bar 30 is determined by the physical size, locations and number of MOSFETs. A plurality of vents 36 may be disposed in bus bars 30, 32 to promote air circulation, and allow soldering of the components during assembly. A schematic diagram showing the general electrical arrangement of MOSFETs 40, 42, 44, 46, capacitors 48 and bus bars 32, 38 is shown in FIG. 5.

A third bus bar 38, shown in FIGS. 1–5, provides an electrical connection between bus bar 30 and bus bar 32. Bus bar 38 extends through core window 34 and has a width that is generally equal to the width of the core window. Bus bar 38 provides a second portion of the low voltage winding, extending generally from "C2" to "C1" and extending down to bus bar 32, minimizing leakage inductance. Thus, taken together, bus bars 32 and 38 form one complete turn of a low voltage winding of the power transformer electrically coupled to high voltage winding 27.

Electrical current flows in bus bar 32 and bus bar 38 in opposite directions, flowing generally between "A1" and "A2." Thus, the gap between bus bar 32 and bus bar 38 between "A1" and "A2" is preferably small. The gap may be controlled in any conventional manner including, without limitation, tape, spacers and insulators. The minimal gap partially compensates for the inductance of bus bars 32, 38 between "A1" and "A2."

A particular advantage of the present invention is reduction of leakage inductance associated with power transformer 12 and its terminations. As noted above, this is accomplished by minimizing the distance between MOSFETs 40, 42, 44, 46 and power transformer 12, as shown in FIGS. 1–4.

Figure 6:
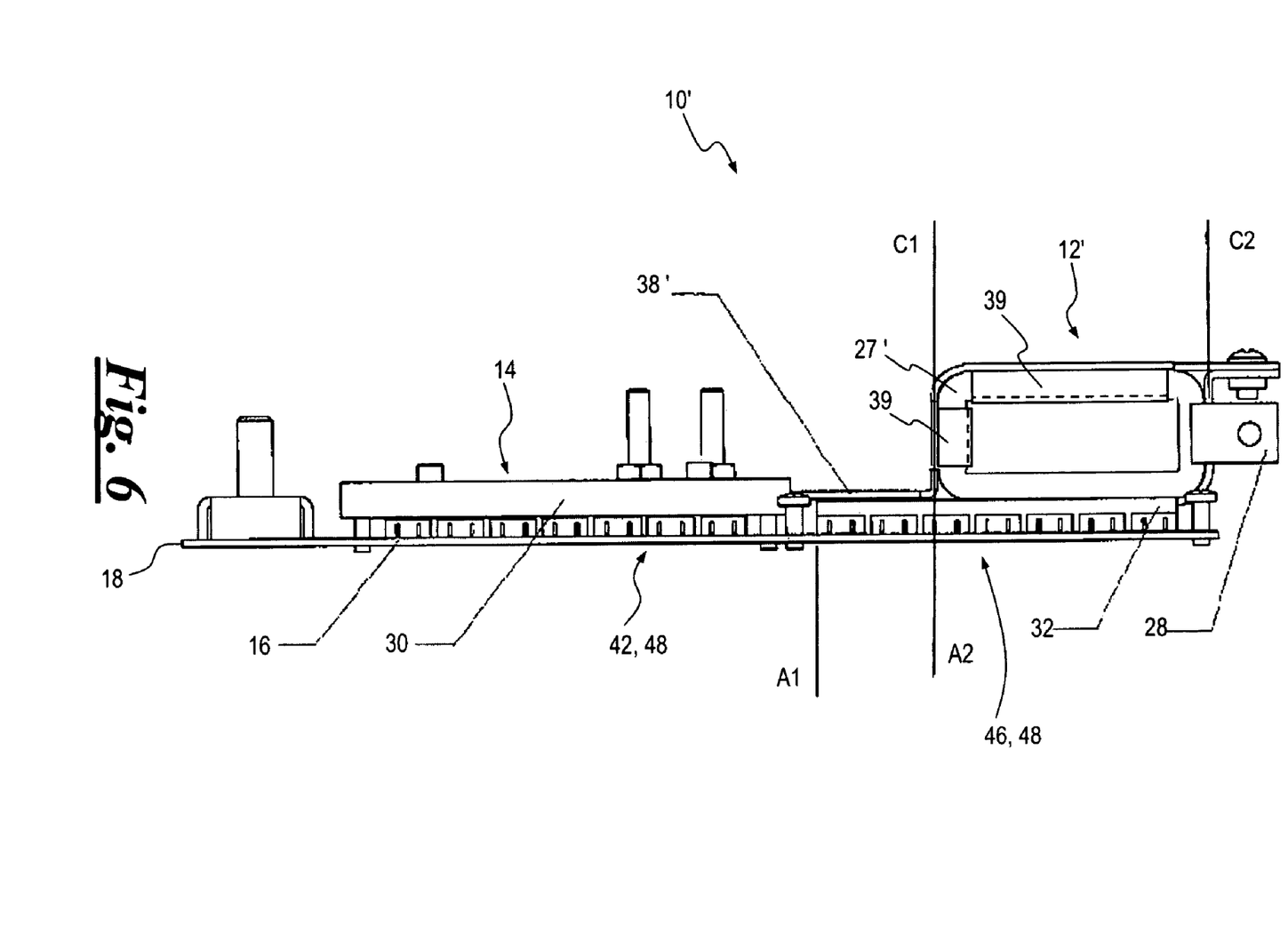
FIG. 6 is an elevational view of a power supply board for a switch mode power supply wherein the transformer (shown without a core for clarity) includes a coaxial bus bar according to an embodiment of the present invention.

In another embodiment of the present invention, shown in FIG. 6, a power supply 10' has a transformer 12' wherein a bus bar 38' is formed into a coaxial shape with the addition of coaxial elements 39. Coaxial elements 39 are each electrically coupled to bus bar 38 at both edges of the bus bar and encircle a high voltage winding 27'. In this embodiment the leakage inductance becomes even smaller, reaching values for the transformer as low as about 10 nH and having low external fields. In addition, inductive electrical coupling between the low voltage and high voltage windings of transformer 12 is increased.

Although only two coaxial elements 39 are shown in FIG. 6, one skilled in the art will recognize that electrical connection terminal 28 may be re-shaped and/or relocated, such as to a corner of high voltage winding 27', to facilitate additional coaxial elements, each element encircling high voltage winding 27' and being electrically connected to bus bar 32' in the manner previously described. In the embodiment of FIG. 6, for example, as many as four coaxial elements 39 may be coupled to bus bars 32' and 38', each coaxial element 39 encircling the generally rectangular-shaped high voltage winding 27' at each of the winding's four generally planar inner surfaces.

Figure 7:
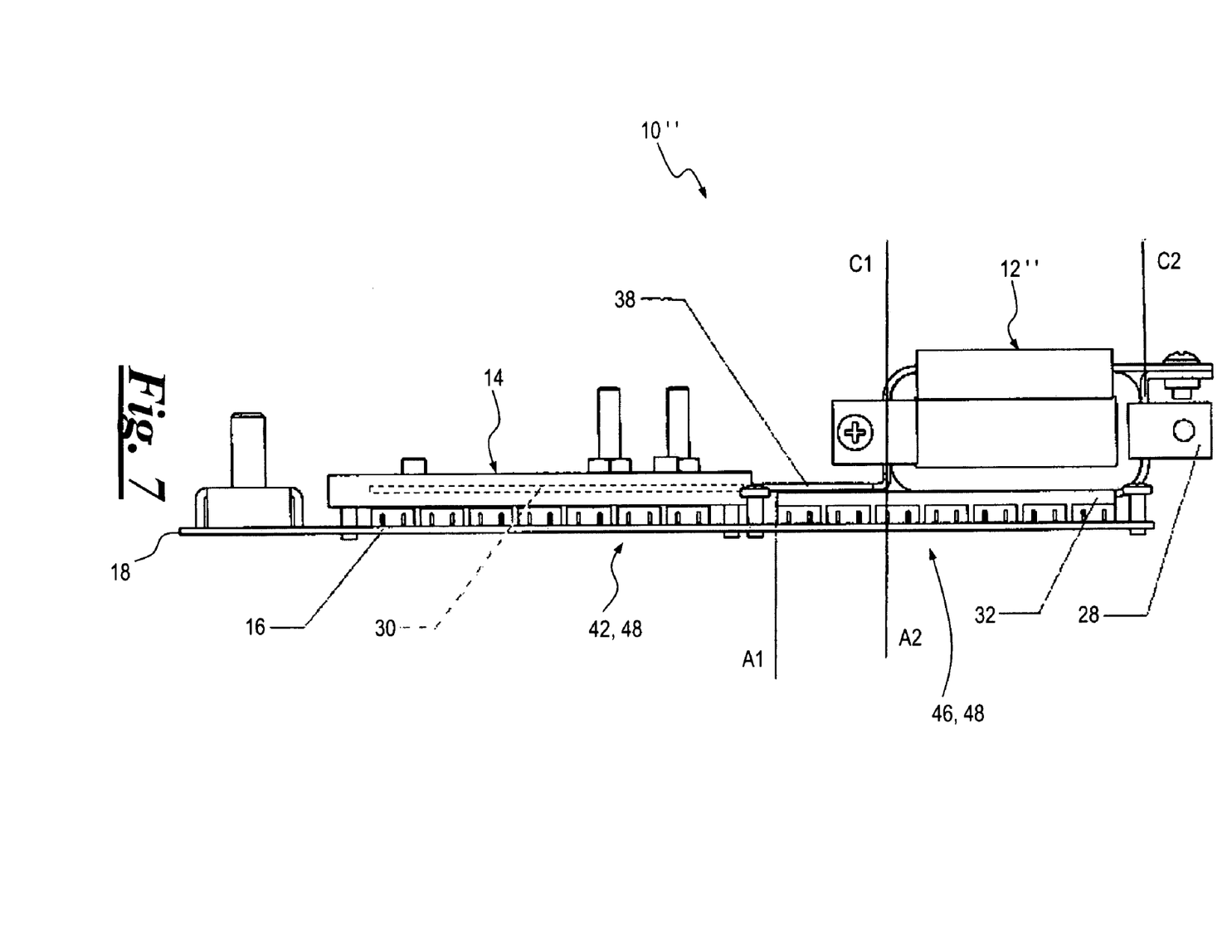
FIG. 7 is a first side elevational view of a power supply board for a switch mode power supply, comprising a power stage and a coreless transformer according to an alternate embodiment of the present invention.
Figure 8:
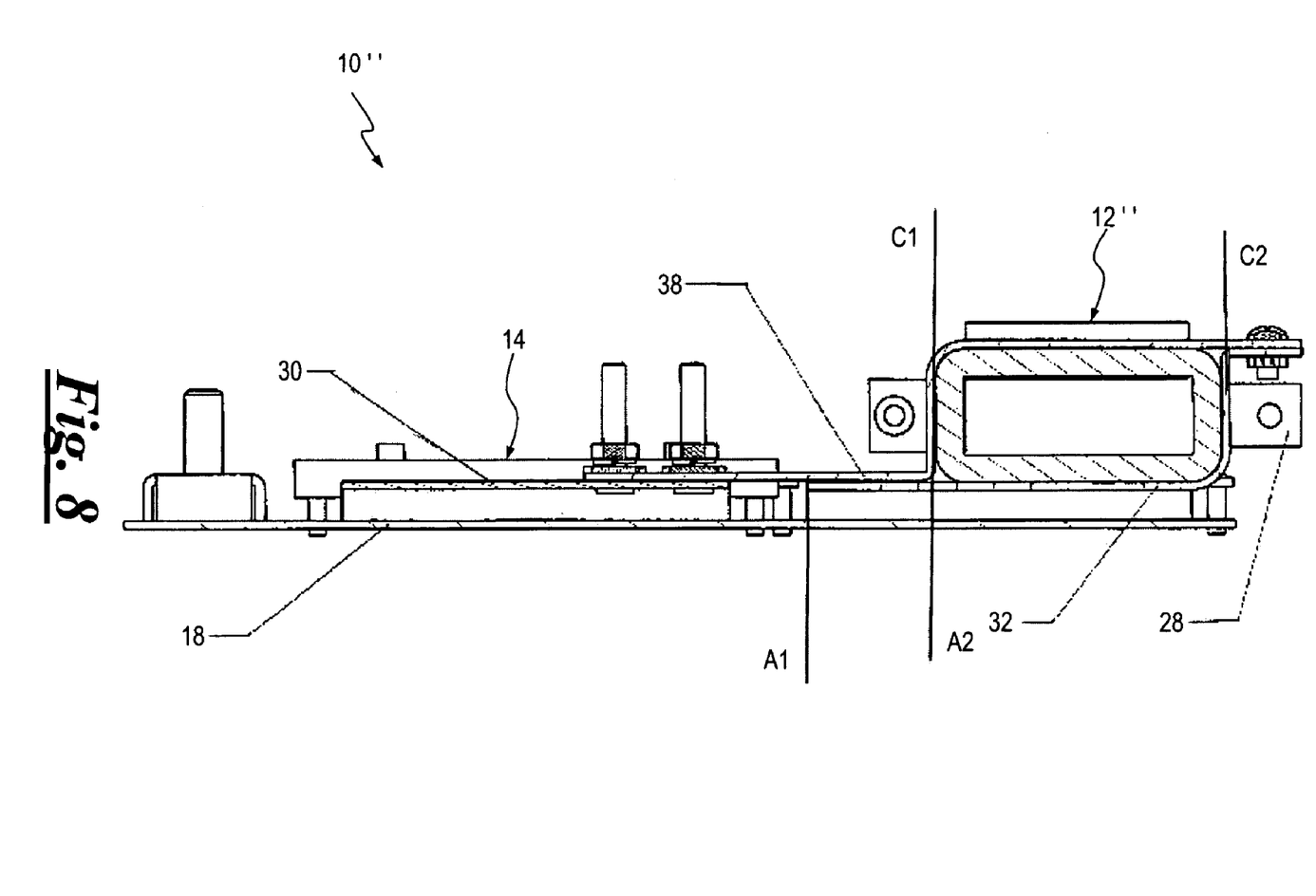
FIG. 8 is a view in section (8—8) of the power supply board of FIG. 2.

FIGS. 7 and 8 depict a power supply board 10" having a coreless transformer 12". Coreless transformer 12" is usable at higher switching frequencies where less magnetizing inductance is required as compared to lower switching frequencies. The foregoing discussion for power supply board 10 is equally applicable to power supply board 10" and thus will not be reiterated herein.

In some embodiments of the present invention bus bar 30 has the same general shape and dimensions as bus bar 32, providing for minimal leakage inductance by locating the bus bars closer together. This embodiment eliminates the need for tapering bus bar 38.

The transformers of present invention, described above, may be configured for use in a bidirectional DC-DC converter. Accordingly, the low voltage winding formed by the second and third bus bars may function as either a primary winding for a step-up converter or a secondary winding for a step-down converter. Likewise, the high voltage winding may function as either a secondary winding for a step-up converter or a primary winding for a step-down converter. The transformers described herein are not limited to DC-DC converters, and may also be utilized with AC-DC, DC-AC and AC-AC converters for voltage step-up, voltage step-down, or electrical isolation without a change in voltage level.

While this invention has been shown and described with respect to a detailed embodiment thereof, it will be understood by those skilled in the art that changes in form and detail thereof may be made without departing from the scope of the claims of the invention.

What is claimed is:

1. A high-frequency transformer, comprising:
   a high-voltage winding;
   a first bus bar positioned proximate the high voltage winding and extending to a first portion of a plurality of power switching devices, the first bus bar being electrically coupled to the first portion of the power switching devices;
   a second bus bar positioned proximate the high voltage winding and extending to a second portion of the power switching devices, the second bus bar being electrically coupled to both the high voltage winding and the second portion of the power switching devices; and
   a third bus bar extending between the first and second bus bars and electrically coupled to the first bus bar, second bus bar, and high voltage winding,
   wherein the second and third bus bars form a low voltage winding that electrically cooperates with the high voltage winding to form the high-frequency transformer.

2. The high-frequency transformer of claim 1 wherein the plurality of power switching devices is configured as one of an H-bridge and a half-bridge.

3. The high-frequency transformer of claim 1 wherein the high-frequency transformer is configured to function as a voltage step-up transformer.

4. The high-frequency transformer of claim 1 wherein the high-frequency transformer is configured to function as a voltage step-down transformer.

5. The high-frequency transformer of claim 1 wherein the transformer is configured to function as a component of a bi-directional DC-DC converter.

6. The high-frequency transformer of claim 1, further comprising a plurality of decoupling capacitors electrically connected to the power switching devices.

7. The high-frequency transformer of claim 1 wherein at least one of the first, second and third bus bars include at least one vent.

8. The high-frequency transformer of claim 1, further comprising a ferrite core assembly.

9. The high-frequency transformer of claim 8 wherein the ferrite core assembly comprises a plurality of generally U-shaped cores and generally I-shaped cores.

10. The high-frequency transformer of claim 1 wherein the high voltage winding further comprises electrical connection terminals.

11. The high-frequency transformer of claim 1 wherein the first and second bus bars have the same general shape and dimensions and are located proximate each other.

12. A high-frequency transformer, comprising:
    a high-voltage winding;
    a first bus bar positioned proximate the high voltage winding and extending to a first portion of a plurality of power switching devices, the first bus bar being electrically coupled to the first portion of the power switching devices;
    a second bus bar positioned proximate the high voltage winding and extending to a second portion of the power switching devices, the second bus bar being electrically coupled to both the high voltage winding and the second portion of the power switching devices; and
    a third, coaxially-shaped bus bar extending between the first and second bus bars and electrically coupled to the first bus bar, second bus bar, and high voltage winding,
    wherein the second and third bus bars form a low voltage winding of a transformer that electrically cooperates with the high voltage winding to form the high-frequency transformer.

13. The high-frequency transformer of claim 12 wherein the plurality of power switching devices is configured as one of an H-bridge and a half-bridge.

14. The high-frequency transformer of claim 12 wherein the coaxially-shaped bus bar generally encircles the high voltage winding.

15. The high-frequency transformer of claim 12 wherein the coaxially-shaped bus bar comprises a plurality of coaxial elements.

16. The high-frequency transformer of claim 12 wherein at least one of the first, second and third bus bars include at least one vent.

17. The high-frequency transformer of claim 12, further comprising a ferrite core assembly.

18. The high-frequency transformer of claim 17 wherein the ferrite core assembly comprises a plurality of generally U-shaped cores and generally I-shaped cores.

19. The high-frequency transformer of claim 12 wherein the high voltage winding further comprises electrical connection terminals.

20. A coreless high-frequency transformer, comprising:
    a high-voltage winding;
    a first bus bar positioned proximate the high voltage winding and extending to a first portion of a plurality of power switching devices, the first bus bar being electrically coupled to the first portion of the power switching devices;
    a second bus bar positioned proximate the high voltage winding and extending to a second portion of the power switching devices, the second bus bar being electrically coupled to both the high voltage winding and the second portion of the power switching devices; and
    a third bus bar extending between the first and second bus bars and electrically coupled to the first bus bar, second bus bar, and high voltage winding,
    wherein the second and third bus bars form a low voltage winding of a transformer that electrically cooperates with the high voltage winding to form the high-frequency transformer.

21. The high-frequency transformer of claim 20 wherein at least one of the first, second and third bus bars include at least one vent.

22. The high-frequency transformer of claim 20 wherein the high voltage winding further comprises electrical connection terminals.

23. The high-frequency transformer of claim 20 wherein the plurality of power switching devices is configured as one of an H-bridge and a half-bridge.

* * * * *